United States Patent [19]
Hsiao

[11] Patent Number: 5,025,898
[45] Date of Patent: Jun. 25, 1991

[54] DRUM BRAKE

[76] Inventor: Rui-Yang Hsiao, No. 265, Sec. 3, Huan Ho S. Rd., Taipei, Taiwan

[21] Appl. No.: 490,072

[22] Filed: Mar. 7, 1990

[51] Int. Cl.⁵ ............................................. F16D 53/00
[52] U.S. Cl. .................. 188/76; 188/106 P; 192/73
[58] Field of Search .............. 188/76, 77, 106 P, 345; 192/72, 73

[56] References Cited

U.S. PATENT DOCUMENTS

| 778,668 | 12/1904 | Hudson et al. | 188/77 R X |
| 1,701,505 | 2/1929 | Perrot | 188/77 R X |
| 2,237,095 | 4/1941 | Casner | 188/77 R X |
| 2,633,938 | 4/1953 | Rodger et al. | 188/77 R |
| 2,867,296 | 1/1959 | Requenes | 188/76 |
| 3,196,986 | 7/1965 | Lowey | 188/77 R |
| 3,236,340 | 2/1966 | Carruth | 188/345 |

FOREIGN PATENT DOCUMENTS 1125884 11/1956 France ..................... 188/76

Primary Examiner—George E. A. Halvosa
Attorney, Agent, or Firm—Dellett, Smith-Hill and Bedell

[57] ABSTRACT

A drum brake has two sets of braking linings. The drum brake includes a brake plate and a brake drum. An additional cylinder is mounted on an outer periphery of the brake plate. The additional cylinder is actuated by hydraulic oil on depression of an additional brake pedal provided proximate to a clutch pedal of the car. A further brake lining is provided around an outer periphery of the brake drum. On depression of the additional brake pedal, the brake lining engages with the outer surface of the brake drum to provide additional stopping capability.

1 Claim, 5 Drawing Sheets

DRUM BRAKE

BACKGROUND OF THE INVENTION

The present invention relates to improved drum brake, particularly to an improved drum brake having two sets of brake linings to enhance the brake effect or to act as an auxiliary brake system when the brake pedal controlled by the right foot of a driver is broken in an emergency situation.

Conventionally, a drum brake for a car which is controlled by a brake pedal comprises a brake plate and a brake drum. Two brake shoes and a cylinder actuated by hydraulic oil on depression of the brake pedal are mounted on an inner side of the brake plate. A first brake lining is mounted on the brake shoe for engaging with an inner surface of the brake drum to provide the brake effect.

Car accidents usually occur due to a short stopping distance or brake system failure. In such circumstances, the driver is unable to stop the car immediately and collision inadvertently occurs. The present invention intends to provide a drum brake in which an additional brake lining is provided around an outer surface of the brake drum together with an additional brake pedal installed proximate to the clutch pedal to aid in shortening the stopping distance of a car.

SUMMARY OF THE INVENTION

The drum brake according to the present invention further comprises a second cylinder with a piston therein mounted on an outer periphery of the brake plate by a mounting means. The second cylinder is also actuated by the hydraulic oil mentioned above on depression of a second brake pedal provided proximate to a clutch pedal of the car. A substantially L-shaped actuating means is mechanically connected to the piston at one end thereof.

A second brake lining is provided around an outer periphery of the brake drum. The second brake lining comprises a first end plate, a second end plate and an annular portion having an inner surface funtionally engageable with the brake drum between the first end plate and the second end plate.

A restraining member is provided to restrain the second end plate. A flange is provided on an outer periphery of the second brake lining proximate to the first end plate. A connecting bar mechanically interconnects the other end of the actuating means and the flange.

The actuating means moves away from the second cylinder by a depression of the second brake pedal, and thereby actuating the flange to move along the outer periphery of the brake drum toward the second end plate so as to cause the inner surface of the second brake lining to make contact with the outer surface of the brake drum. The second brake lining lets go of the brake drum by a return spring when the second brake pedal is released.

It is therefore an object of the present invention to provide a drum brake having an additional brake lining to act as an auxiliary brake system when the original brake system is broken.

Another object of the present invention is to provide a drum brake to provide move stopping capability.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENTS

Figure 1:
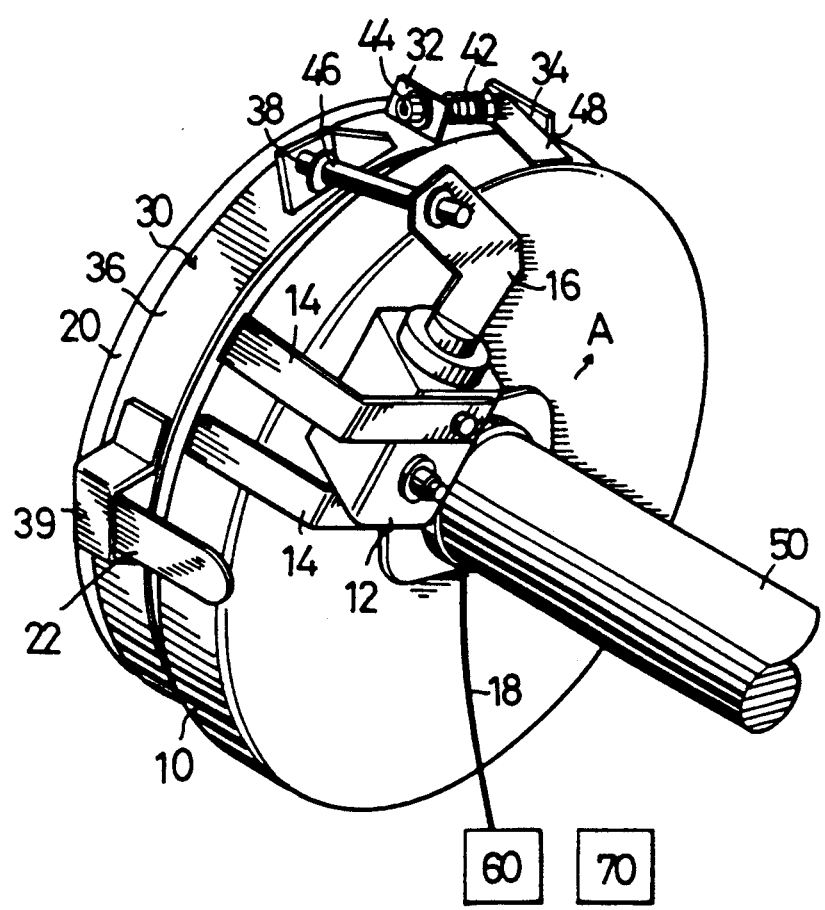
FIG. 1 is a perspective view of a drum brake in accordance with the present invention.
Figure 1A:
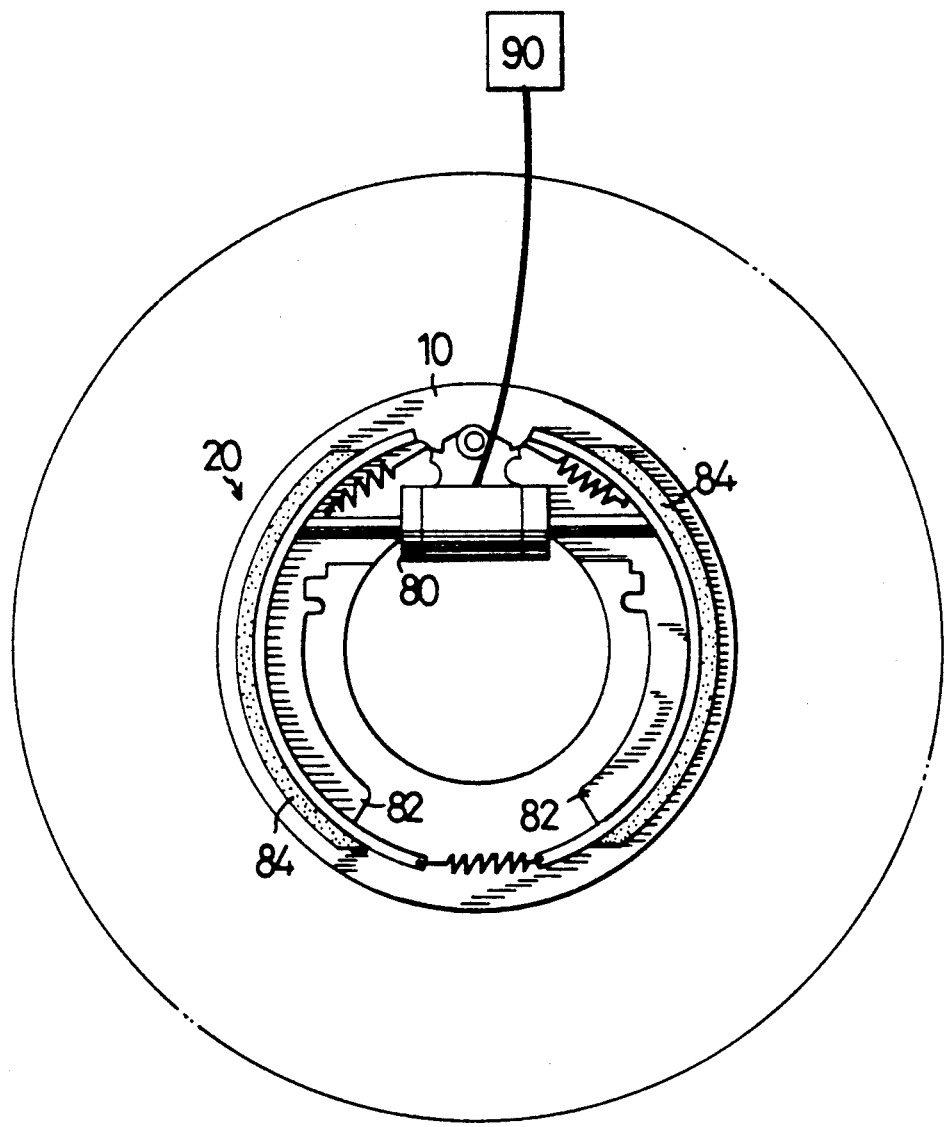
FIG. 1a is an elevation view showing an inner arrangement of the drum brake of FIG. 1.
Figure 2:
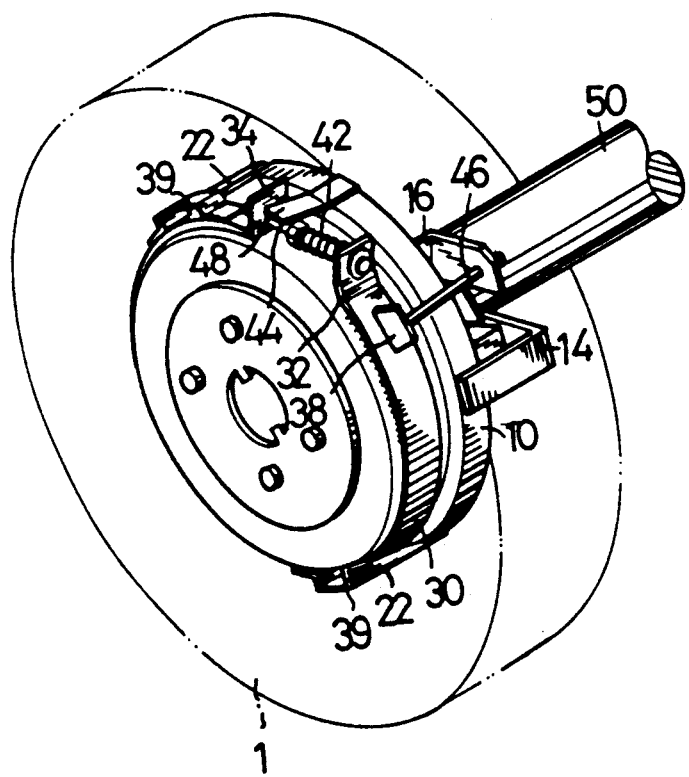
FIG. 2 is another perspective view of the drum brake in accordance with the present invention mounted on a wheel of a car.

Please refer to FIGS. 1, 1a and 2. Generally, a drum brake for a car controlled by a first brake pedal 90 comprises a brake plate 10 and a brake drum 20 mounted on a shaft 50 of a wheel 1 of the car. Two brake shoes 82 and a first cylinder 80 actuated by hydraulic oil on depression of the first brake pedal 90 are mounted on an inner side of the brake plate 10. Pedal 90 is shown only schematically. A first brake lining 84 is mounted on each brake shoe 82. Such drum brake construction is well-known and no further explanation is needed.

Nevertheless, a drum brake according to the present invention further comprises a second cylinder 12 with a piston 65 therein mounted on an outer periphery of the brake plate 10 by mounting means 14. The second cylinder 12 is also actuated by the hydraulic oil mentioned above via an oil tube 18 upon a depression of a second brake pedal 60 provided proximate to a clutch pedal 70 of the car. Pedals 60 and 70 are shown only schematically. A substantially L-shaped actuating means 16 is mechanically connected to the piston at one end thereof.

A second brake lining 30 is provided around an outer periphery of the brake drum 20. The second brake lining 30 comprises a first end plate 32, a second end plate 34 and an annular portion 36 having an inner surface fuctionally engageable with the brake drum 20 between the first end plate 32 and the second end plate 34.

An adjusting screw 44 is mounted to the second end plate 34 with its distal end towards the first end plate 32. A restraining member 48 is mounted (for example, by welding) on the outer periphery of the brake plate 10 at a first end thereof and a second end of the restraining member 48 is transversely mounted (for example, by welding) to the adjusting screw 44 for restraining the second end plate 34 to its position. A return spring 42 is mounted to the distal end of the adjusting screw 44 at a first end thereof. A second end of the return spring 42 is attached to the first end plate 32. A flange 38 is provided on an outer periphery of the second brake lining 30 proximate to the first end plate 32. A connecting bar 46 mechanically interconnects the other end of the actuating means 16 and the flange 38.

A plurality of substantially inverted L-shaped retaining means 39 are mounted on an outer periphery of the second brake lining 30.

A plurality of flexible holding strips 22 are mounted on the brake drum at one end thereof relative to each retaining means 39. Each holding strip 22 extends toward the second brake lining 30 and having an acute angle with the outer periphery of the brake drum 20. A second end of each the holding strip 22 is attached to an inner surface of each corresponding retaining means 39 for retaining the brake lining 30 not engaging with the brake drum 20 when the second brake pedal 60 is not depressed.

Figure 3:
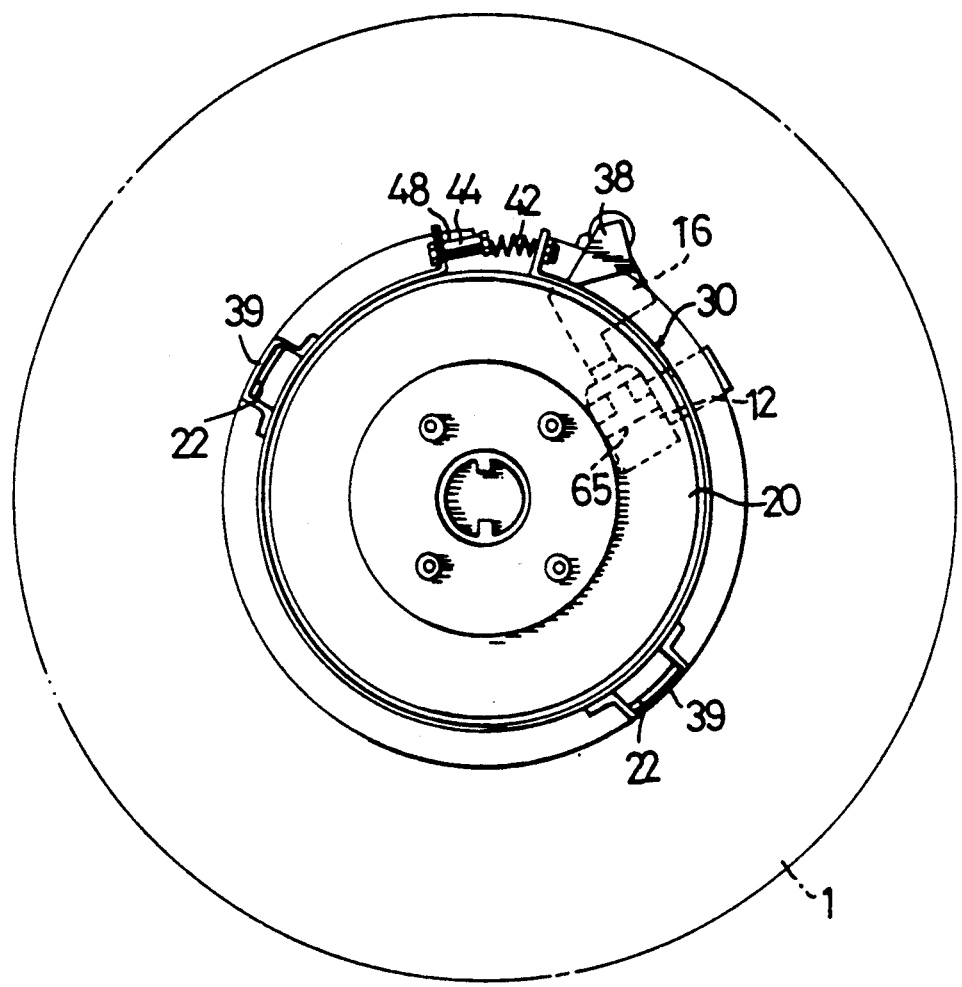
FIG. 3 is a plane view of the drum brake of FIG. 2 as seen from the left side, wherein a second brake lining of a drum brake in accordance with the present invention has not engaged with a brake drum.
Figure 4:
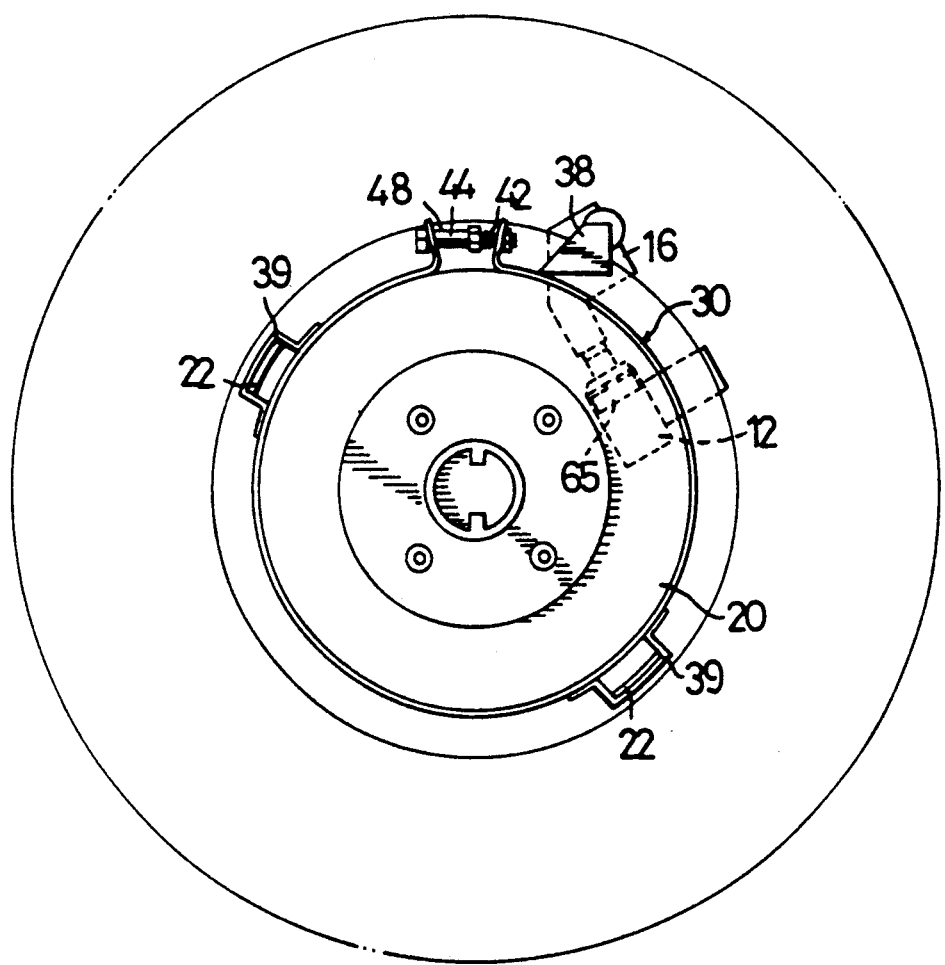
FIG. 4 is a plane view similar to FIG. 3, wherein the second brake lining of the drum brake in accordance with the present invention engages with the brake drum.

As shown in FIG. 3, initially, the second brake lining 30 has not engaged with the outer periphery of the brake drum 20. on depression of the second brake pedal 60, the hydraulic oil is forced to enter the second cylinder 12 and actuates the piston in the second cylinder 12. The actuating means 16 is actuated to move away from the second cylinder 12 thereby actuating the flange 38 as well as the first end plate 32 to move along the outer periphery of the brake drum 20 toward the second end plate 34. The inner surface of the brake lining 30 therefore contacts with the outer surface of the brake drum 20 as shown in FIG. 4. The brake lining 30 leaves the brake drum 20 by the return spring 42 when the second brake pedal 60 is released.

Accordingly, under an urgent condition, a driver may depress the first and the second brake pedals simultaneously with his or her right and left feet, respectively, so as to effect maximum stopping capability. Furthermore, even when the first brake pedal is broken, the left brake pedal can be in place of the broken first brake pedal. The adjusting screw 44, as conventional drum brake devices, provides an adjustment of the second brake lining 30 so as to provide a desired engaging effect with the brake drum 20.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. In a drum brake of a car controlled by a first brake pedal, comprising a brake plate and a brake drum, at least one brake shoe and a first cylinder actuated by hydraulic oil on depression of said first brake pedal being mounted on an inner side of said brake plate, a first brake lining being mounted on said brake shoe, the improvements further comprising:
   a second cylinder having a piston therein being mounted on an outer periphery of said brake plate by mounting means, said second cylinder being actuated by said hydraulic oil on depression of a second brake pedal provided proximate to a clutch pedal of the car, a substantially L-shaped actuating means being mechanically connected to said piston at one end thereof;
   A second brake lining being provided around an outer periphery of said brake drum, said second brake lining comprising a first end plate, a second end plate and an annular portion having an inner surface fuctionally engageable with said brake drum between said first end plate and said second end plate, an adjusting screw being mounted to said secon end plate with a distal end thereof towards said first end plate, a restraining member being mounted on said outer periphery of said brake plate at a first end thereof and a second end of said restraining member being transversely mounted to said adjusting screw for restraining said second end plate at its position, a return spring being mounted to said distal end of said adjusting screw at a first end thereof, a second end of said return spring being mounted to said first end plate, a flange being provided on an outer periphery of said second brake lining proximate to said first end plate, a connecting bar mechanically interconnecting the other end of said actuating means and said flange;
   a plurality of substantially inverted U-shaped retaining means being mounted on an outer periphery of said second brake lining;
   a plurality of flexible holding strips being mounted on said brake drum at one end thereof relative to each said retaining means, each said holding strip extending towards said second brake lining and having an acute angle with said outer periphery of said brake drum, a second end of each said holding strip being attached on an inner surface of each corresponding said retaining means for retaining said brake lining from engaging with said brake drum when said second brake pedal is not depressed; and
   said actuating means being movable away from said cylinder via a depression of said second brake pedal and thereby actuating said flange as well as said first end plate to move along said outer periphery of said brake drum toward said second end plate so as to cause said inner surface of said second brake lining contacting with said outer surface of said brake drum, said second brake lining releasing said brake drum by said return spring when said second brake pedal is released.

* * * * *